3,376,215
HYDROCARBON CONVERSION PROCESS AND CATALYST
Ralph J. Bertolacini, Chesterton, and Harry M. Brennan, Hammond, Ind., assignors to Standard Oil Company, Chicago, Ill., a corporation of Indiana
No Drawing. Filed Sept. 28, 1965, Ser. No. 491,016
10 Claims. (Cl. 208—138)

This invention relates to hydrocarbon conversion catalysts and more particularly, to such catalysts which contain a particular form of zeolite.

Group VIII metal-containing catalysts have been employed on a commercial scale in a wide range of reactions, most of them involving hydrogenation, dehydrogenation, oxidation, isomerization, and dehydrocyclization. Especially successful has been the use of alumina-supported platinum catalysts in the conversion of low-octane petroleum naphthas under hydroforming conditions into gasolines of high anti-knock rating. In a typical platinum-hydroforming process, a mixture of charging stock and hydrogen-containing gas is passed through a bed of platinum-alumina-halogen catalyst containing between about 0.05 to 1% by weight of platinum. The hydroforming reactions are carried out at a temperature in the range of about 800 to 1000° F., a total pressure between about 100 and 1200 pounds per square inch gauge, a hydrogen partial pressure between about 50 and 1000 pounds per square inch, hydrogen rate of 2,000 to 10,000 standard cubic feet per barrel of charging stock, and a weight hourly space velocity between about 0.5 to 10.

The activity and selectivity of hydrocarbon conversion catalysts depend upon a variety of factors, such as the identity and condition of the catalyst components, the mode of catalyst preparation, the presence or absence of promotors and modifiers, the presence or absence of contaminating materials in the charging stock and the proportion thereof, the conversion temperature, the hydrogen partial pressure in the conversion zone, and the like. Suitable catalysts are conveniently prepared by commingling a Group VIII metal compound with a hydrous adsorbent refractory inorganic oxide, such as alumina, and thereafter drying and calcining. A new catalyst composition has now been discovered which affords a hydrocarbon conversion catalyst of greatly improved catalytic properties.

Accordingly, this invention provides a hydrocarbon conversion catalyst comprising a cocatalytic solid support containing a Group VIII metal, which support comprises (1) adsorbent refractory inorganic oxide and (2) mordenite structure zeolite having deposited thereon about 10 to about 1,000 p.p.m. by weight, based on zeolite, of a metal selected from the class consisting of alkali metals, alkaline earth metals and mixtures thereof. A preferred adsorbent refractory inorganic oxide is alumina. The support contains 0.1 to 25 wt. percent preferably about 0.5 to 5 wt. percent of the mordenite. Group VIII metals which are particularly useful are the noble metals. Platinum is a preferred Group VIII metal.

In another aspect, the invention provides a hydrocarbon conversion catalyst comprising a support having as major ingredients mordenite structure zeolite and an adsorbent refractory metal oxide, said support containing a Group VIII metal; said zeolite being in a form selected from the class consisting of the unexchanged cation form and ion exchanged form and ion exchanged form containing at least one of the following cations: cations of alkali metals, cations of alkaline earth metals, ammonium ions, hydrogen ions; said zeolite also having deposited thereon about 10 to about 1,000 p.p.m. by weight, based on zeolite of a metal selected from the class consisting of alkali metals, alkaline earth metals and mixtures thereof.

In still another aspect, the invention provides a process for converting hydrocarbons which comprises contacting hydrocarbon under hydrocarbon conversion conditions with a hydrocarbon conversion catalyst comprising a cocatalytic solid support containing a Group VIII metal, which support comprises (1) absorbent refractory inorganic oxide and (2) mordenite structure zeolite having deposited thereon about 10 to about 1,000 p.p.m. by weight, based on zeolite, of a metal selected from the class consisting of alkali metals, alkaline earth metals and mixtures thereof.

Our improved catalysts are broadly useful in hydrocarbon conversion reactions which are catalyzed by Group VIII metals. Specifically, our catalysts are useful for reforming, isomerization, hydrogenation, hydrocracking, dehydrogenation, oxidation, polymerization, condensation, and other reactions known in the art. Our catalysts are especially advantageous in the hydroforming of petroleum naphthas boiling in the range of about 180 to 400° F. and are capable of upgrading a 50% naphthenic naphtha having a research octane number of only 40 to 50 into a $C_{5+}$ gasoline having a Research octane number of 90 to 100 in a yield of 75 to 90%.

When employed in the reforming or hydroforming of various hydrocarbon fractions, our catalysts simultaneously effect a group of reactions, including the production 6-membered ring naphthenes from other naphthenes by isomerization, dehydrogenation of naphthenes to form aromatics, cyclization of paraffins to form aromatics, isomerization of straight-chain paraffins to form branched-chain paraffins, cracking of paraffins to carbon and to unsaturated fragments of lower molecular weight, hydrogenation of carbon and of the unsaturated fragments, and various side reactions. All of these reactions tend to produce products containing motor-fuel fractions of improved anti-knock rating.

In utilizing the new catalysts of this invention for the continuous reforming of hydrocarbons, a feed stock consisting essentially of a virgin naphtha, a cracked naphtha, or a mixture thereof, boiling within the range of about 70 to about 500° F., and preferably within the range of about 180 to 400° F. is contacted in the vapor phase with the catalyst at a temperature within the range of about 800 to 1050° F., the average temperature throughout the catalyst bed being maintained within the range of about 875 to 950° F., preferably around 900° F. The process is operated at a pressure within the range of about 200 to 1000 pounds per square inch, preferably from about 200 to 400 pounds per square inch. Hydrogen is included within the reaction zone, ordinarily by recycle, in the range of about 2 to 8 moles of hydrogen per mole of feed, preferably between about 3 and 6 moles per mole. It is preferred to adjust the composition of our catalyst and to adjust the operating conditions so that there is at least a small net production of hydrogen, the introduction of hydrogen from an outside source being thereby rendered unnecessary. This can conveniently be effected for a given catalyst composition by adjusting the proportion of naphthenes in the charging stock to produce at least enough hydrogen to saturate the materials produced by the paraffin-cracking reactions and to provide for the normal venting requirements.

Our new catalysts can be employed in any of the conventional types of equipment known to the art. We may, for example, employ the catalyst in the form of pills, pellets, granules, broken fragments, or various special shapes, disposed as a fixed bed within a reaction zone, and the charging stock may be passed therethrough in the liquid, vapor, or mixed phase, and in either upward or downward flow. Alternatively, we may prepare the catalyst in a suitable form for use in moving beds, in which the charging stock and catalyst are preferably passed in countercurrent flow; or in fluidized-solid processes, in which the charging stock is passed upward through a turbulent bed of finely divided catalyst; or in the suspensoid process, in which the catalyst is slurried in the charging stock and the resulting mixture is conveyed into the reaction zone. The reaction products from any of the foregoing processes are separated from the catalyst, vented to atmospheric pressure, and fractionated to recover the various components thereof. The hydrogen and unconverted materials are recycled as desired.

The catalysts of this invention are superior in stability, especially under adverse conditions which seriously impair the activity of prior-art catalyst, such as sulfur and nitrogen containing feeds. An important advantage of the catalysts of this invention over prior-art catalysts is that no halogen is required, thus attendant corrosion problems and halogen level maintenance problems are avoided.

The adsorbent refractory inorganic oxide base or support advantageously comprises either gamma alumina or eta alumina, or mixtures of these allotropic forms. These definitions of alumina are definitions adopted as standard nomenclature by Russell in his brochure entitled, "Alumina Properties," Technical Paper No. 10, 1953, Aluminum Company of America, and by Stumpf et al., Ind. Eng. Chem., 42, 1950, pages 1398–1403.

Zeolites are porous crystalline alumino-silicates and are well known in the art. Naturally occurring zeolites are, for example, chabazite, gmelinite, erionite, mordenite and faujasite. Zeolites have rigid three-dimensional anionic networks with intracrystalline channels whose narrowest cross section has essentially a uniform diameter. Zeolites are to be distinguished from crystalline alumino-silicate clays such as bentonite, which have a two-dimensional layer structure, and from amorphous alumino-silicates such as synthetic silica-alumina cracking catalyst, which has a random structure. Synthetic zeolites, designated as Type X and Type Y molecular sieves, are commercially available from Linde Company.

The zeolites are composed of alkali or alkaline earth metal oxides, alumina and silica in various proportions. In the case of a given zeolite, the intracrystalline channels, generally designated as pores, can be varied in size to a certain extent by replacing all or part of the exchangeable cations with other suitable ions by ion-exchange. The zeolites are used for drying and for separating certain hydrocarbon types, and even have been proposed as catalyst for hydrocarbon conversion reactions such as cracking.

The zeolite employed in the catalyst of this invention is a particular form of zeolite known as mordenite. While mordenite is naturally occurring, a synthetic mordenite known as Zeolon has become available commercially from the Norton Company. Mordenite is characterized by its high silicon to aluminum ratio of about 5:1 and its crystal structure. Composition of mordenite as given in Kirk-Othmer, "Encyclopedia of Chemical Technology," vol. 12, page 297, is $(Ca, Na_2) \ Al_2Si_9O_{22}6H_2O$. The proposed structure is one in which the basic building block is a tetrahedron consisting of one silicon or aluminum atom surrounded by four oxygen atoms. The crystal is made up of chains of 4- and 5-membered rings of these tetrahedra. These 4- and 5-membered rings are believed to give the structure its stability. The chains are linked together to form a network having a system of large parallel channels interconnected by small cross channels. Rings of 12 tetrahedra form the large channels. Other synthetic zeolites also have such 12-membered rings but they have interconnected cages whereas the mordenite has parallel channels of uniform diameter. For example, synthetic faujasite, which has the formula $Na_3Al_3Si_4O_{14}$, is characterized by a 3-dimensional aray of pores which consist of 12–13 A. cages interconnected through 8–9 A. windows The catalyst of this invention can be prepared in various ways. A preferred adsorbent refractory inorganic oxide for use in the present invention is alumina. Other adsorbent refractory inorganic oxides which may be used include, for example, silica gel, silica-alumina, magnesia-alumina, zirconia-alumina, etc. The catalyst composition of the present invention may be produced in various ways. For example, the alkali metal and/or alkaline earth metal may be deposited on mordenite structure zeolite, such as by impregnation with a solution of non-halogen salt thereof, the zeolite washed free of excess salt, the impregnated finely divided zeolite stirred into alumina sol, a soluble non-halogen Group VIII metal compound such as, for example $(NH_3)_2Pt(NO_2)_2$, added to the sol, and the sol mixture cogelled by addition of dilute ammonia and the resulting solid dried and calcined. Another way of preparing the catalyst composition is by mixing the impregnated finely divided zeolite into alumina sol as above, gelling the sol by addition of dilute ammonia to produce a gel which is then dried and pelleted. The pellets are then calcined, cooled and then impregnated with a Group VIII metal solution. A third method, which is also suitable for making the catalyst composition of this invention, is to blend an alumina hydrogel and the impregnated finely divided mordenite zeolite and adding to this blend a solution of the Group VIII metal and thoroughly blending the mixture. The resulting gel mixture is then dried, pelleted and the pellets calcined. Suitable drying conditions for use in the various catalyst manufacturing methods include a temperature in the range of about 200 to 400° F. for a time in the range of about 5 to 30 hours. Suitable calcination conditions include a temperature in the range of about 900 to 1500° F. for a time of about 2 to 20 hours. Preferred drying and calcining conditions are a temperature of about 250° F. for about 16 hours and a temperature of about 1,000° F. for about 6 hours, respectively.

Components such as halogen, for example, other than Group VIII metals, mordenite structure zeolite, alumina and the alkali and/or alkaline earth metals may be present in the catalyst composition in minor amounts, usually less than about 1.0%, provided they do not exhibit undesirable physical or chemical effects on the catalyst or on any process employing the same.

*Examples*

A catalyst which is a preferred embodiment of the present invention was prepared by impregnating Zeolon-H with aqueous $Na_2CO_3$ to deposit 1,000 p.p.m. by wt. of sodium on the zeolite, impregnated Zeolon was blended into alumina sol in the amount required to produce 2 wt. percent zeolite in the finished catalyst and sufficient $(NH_3)_2Pt(NO_2)_2$ was added to produce a platinum content in the finished catalyst of 0.6 wt. percent. The sol was then gelled, dried and calcined by standard art-recognized techniques.

The above catalyst and a prior-art platinum-alumina-halogen reforming catalyst containing 0.8 wt. percent platinum and 0.8 wt. percent chloride were each subjected to 18-hour hydroforming tests under standardized test conditions, employing about 20–25 grams of catalyst in a quasi-isothermal reaction zone immersed in a molten salt bath for temperature control. The tests were carried out at a bath temperature of 900° F., a pressure of 250 p.s.i.g., a weight hourly space velocity of 2.3 and a once-through hydrogen rate of 5,000 standard cubic feet per barrel of feed. A Mid-Continent virgin naphtha having an ASTM boiling range of about 200–390° F. was employed as feed.

In each test the catalyst activity was calculated as the relative quantity, expressed as a percentage, of an arbitrarily-chosen reference catalyst, containing 0.6 percent platinum on alumina, required to produce a $C_{5+}$ product fraction having the same octane number from the same Mid-Continent virgin naphtha feed under the same test conditions. The results were as follows:

Catalyst: Activity
Sodium - impregnated-mordenite-containing catalyst _____ 214
Platinum-alumina-chlorine catalyst _____ 137

Thus, surprisingly, the catalyst containing an alkali metal, sodium, which is avoided by the prior art, and which contains no halogen promoter as is used by the prior art, exhibits a significantly higher hydroforming activity than prior-art platinum-alumina-halogen catalyst.

While the invention has been described with reference to certain specific embodiments thereof, it is to be understood that such embodiments are illustrative only and not by way of limitation. Numerous modifications and equivalents of the invention will be apparent from the foregoing description to those skilled in the art and such modifications and equivalents are to be deemed within the scope of the invention.

What is claimed is:

1. A hydrocarbon conversion catalyst comprising a co-catalytic solid support and a Group VIII noble metal, said support consisting essentially of (1) adsorbent refractory inorganic oxide and (2) mordenite structure zeolite having deposited thereon about 10 to about 1000 p.p.m. by weight, based on zeolite, of a metal selected from the class consisting of alkali metals, alkaline earth metals and mixtures thereof, said solid support containing from about 0.1 to about 25 wt. percent of said mordenite structure zeolite, said Group VIII noble metal having been incorporated with said support.

2. The catalyst of claim 1 wherein said adsorbent refractory inorganic oxide consists essentially of alumina.

3. The catalyst of claim 2 wherein said Group VIII metal is platinum.

4. A hydrocarbon conversion catalyst comprising a support and a Group VIII noble metal, said support consisting essentially of mordenite structure zeolite and an adsorbent refractory metal oxide, said mordenite structure zeolite being present in an amount between about 0.1 and about 25 wt. percent; said zeolite being in a form selected from the class consisting of the unexchanged cation form and ion exchanged form containing at least one of the following cations: cations of alkali metals, cations of alkaline earth metals, ammonium ions, hydrogen ions; said zeolite also having deposited thereon about 10 to 1,000 p.p.m. by weight, based on zeolite, of a metal selected from the class consisting of alkali metals, alkaline earth metals and mixtures thereof, and said Group VIII noble metal having been incorporated with said support.

5. The catalyst of claim 4 wherein said oxide is alumina.

6. The catalyst of claim 5 wherein said Group VIII metal is platinum.

7. A process for converting hydrocarbons which boil within the range between about 70° F. and about 500° F., which process comprises contacting hydrocarbon under hydrocarbon conversion conditions with the catalyst of claim 1.

8. The process of claim 7 wherein said hydrocarbon boils within the gasoline boiling range and said conditions are hydroforming conditions, which conditions include a temperature between about 800° F. and about 1050° F., a pressure between about 200 and 1000 pounds per square inch, and the presence of hydrogen in an amount between about 2 and about 8 moles of hydrogen per mole of hydrocarbon.

9. A method of preparing a hydrocarbon conversion catalyst which method comprises depositing on mordenite structure zeolite about 10 to about 1,000 p.p.m. by weight, based on zeolite, of a metal selected from the class consisting of alkali metals, alkaline earth metals, and mixtures thereof to form an impregnated zeolite; forming an adsorbent refractory cocatalytic support material comprising 0.1 to 25 wt. percent of said impregnated zeolite and 75 to 99.9 wt. percent adsorbent alumina; and incorporating with said support material about 0.01 to 10.0 wt. percent of a Group VIII noble metal.

10. The method of claim 9 wherein said zeolite is first ion exchanged to replace a substantial portion of the exchangeable metal cations with hydrogen ions.

References Cited
UNITED STATES PATENTS

| | | | |
|---|---|---|---|
| 2,971,904 | 2/1961 | Gladrow et al. | 208—135 |
| 3,267,022 | 8/1966 | Hansford | 208—111 |
| 3,301,917 | 1/1967 | Wise | 208—138 |
| 2,915,458 | 12/1959 | Slyngstad et al. | 208—138 |
| 3,190,939 | 6/1965 | Benesi | 260—683.65 |
| 3,226,339 | 12/1965 | Frilette et al. | 208—138 |
| 3,326,903 | 2/1966 | Milton | 260—666 |
| 3,251,902 | 5/1966 | Garwood et al. | 208—135 |

HERBERT LEVINE, *Primary Examiner.*